United States Patent

Beattie et al.

[15] 3,640,627
[45] Feb. 8, 1972

[54] APPARATUS FOR MEASURING SCATTERED LIGHT

[72] Inventors: Willard H. Beattie, Long Beach; William S. Gallaway, Fullerton, both of Calif.

[73] Assignee: Beckman Instruments, Inc.

[22] Filed: Mar. 1, 1965

[21] Appl. No.: 435,792

[52] U.S. Cl. .......................................... 356/104, 356/246
[51] Int. Cl. ................................... G01n 21/00, G01n 1/10
[58] Field of Search .................. 350/314, 315, 316; 88/14 FB, 88/14 SA, 14 S, 14, 14 SH, 14 SI; 356/104, 244, 246

[56] References Cited

UNITED STATES PATENTS

| 2,721,942 | 10/1955 | Friel et al. | 88/14 SA |
| 2,660,926 | 12/1953 | Talley | 350/316 |
| 3,063,043 | 11/1962 | Coates | 88/14 SA |
| 3,334,537 | 8/1967 | Beattie | 88/14 SA |

*Primary Examiner*—Ronald L. Wibert
*Assistant Examiner*—V. P. McGraw
*Attorney*—Paul R. Harder and Robert J. Steinmeyer

[57] ABSTRACT

A light-scattering accessory for double-beam spectrophotometers and an improved double-beam, ratio-recording light-scattering spectrophotometer are disclosed. The attachment may be utilized to convert a standard double-beam spectrophotometer into a scattered light-measuring device and consists of an attachment having housed therein a means for directing the sample beam to a sample cell and a detector located on a goniometer rotatable about the cell. The reference beam is passed through an optical attenuator to the detector of the spectrophotometer. Electrical attenuation devices are provided and may comprise either a single attenuating potentiometer connected to each of the detectors or separate attenuators connected to the separate detectors. The attenuators allow measurement of signals over a wide dynamic range by attenuating either the reference or the sample signal and when utilized in combination with the optical attenuator located in the reference beam provide an extremely wide dynamic range for the instrument. Also disclosed is a novel sample cell and beam trap, the beam trap consisting of a piece of black glass having at least one optically flat surface and a black glass rod attached thereto to suspend the glass plate in the beam. The sample cell may be provided with a single optically transmitting window and the beam trap located within the cell for improved results.

9 Claims, 3 Drawing Figures

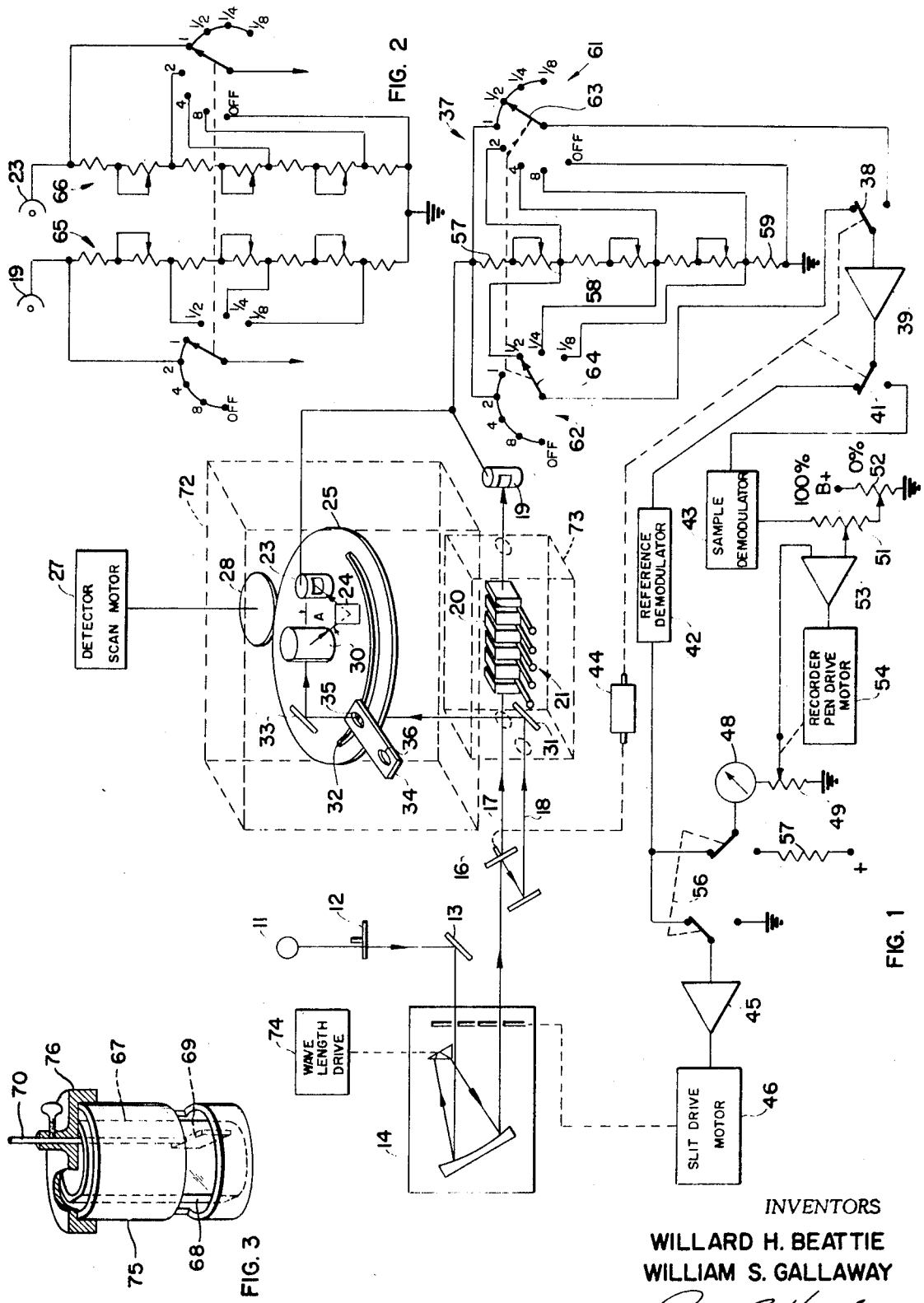

APPARATUS FOR MEASURING SCATTERED LIGHT

This invention relates generally to spectroscopy and more particularly relates to methods and apparatus for measuring the light-scattering characteristics of samples.

In U.S. Pat. No. 3,334,537 by Williard H. Beattie and assigned to the assignee of the instant invention, there is disclosed new and useful apparatus and methods for performing various light-scattering analysis and particularly a light-scattering attachment capable of use with a conventional double-beam, ratio-recording spectrophotometer which may be operated in either a single-beam or a double-beam mode thereby allowing measurement of the intensity of scattered light from a sample or the ratio of the scattered intensity to the incident intensity each as functions of time, angle or wavelength.

While the instrument disclosed therein is generally satisfactory, certain difficulties are present which have been overcome by a scattered light spectrophotometer constructed according to the teachings of this invention. In the previous application a single detector is located upon a disc which is rotatable with respect to the sample cell such that radiation scattered at various angles to the incident or excitation radiation can be measured by rotating the disc about the sample cell. Reference beam energy is reflected along the axis of rotation of the disc onto a diffuse reflector mounted below the disc at its center of rotation. Radiation from the diffuse reflector is directed to an additional pair of mirrors fixed to the rotatable disc to provide a reference beam path to the detector regardless of its position with respect to the sample. The reference signal output of the detector has been found to vary slightly with the angle of rotation of the disc and the sample and reference signals are not exactly proportional one to the other. It is believed that these effects are caused by variations of the reference beam with angle or variations in stray light with change of angle. It is probable that the change in reference signal with angle is due to some nonlinearity introduced by the sample and reference beams striking the detector at different angles. These problems have been eliminated in the apparatus of the present invention by the utilization of a pair of detectors without compromise of the advantages of the double beam instrument.

Radiation scattered by a sample usually varies between $10^{-10}$ and $10^{-4}$ of the incident radiation. In most light-scattering photometers of the prior art and in the light-scattering spectrophotometer disclosed in the aforementioned application, a beam trap is provided for the sample beam after it has passed through the sample cell. Although such beam traps are satisfactory, reflections of the incident beam occur at the exit window of the cell which, in the presence of the extremely small amounts of radiation scattered by most samples, is somewhat troublesome. The reflection of the incident beam at the exit window of the cell can be eliminated by a beam trap constructed in accordance with the teachings of the present invention.

As previously pointed out the intensity of the radiation scattered from a sample usually varies between $10^{-10}$ and $10^{-4}$ of the intensity of the incident radiation. These intensities are not only much weaker than those generally measured on a spectrophotometer but vary as a function of angle over several orders of magnitude. It may therefore be necessary to calibrate the spectrophotometer at one or two orders of magnitude more than subsequent measurements yet it is desirable that each measurement have the same relative accuracy. In ratio-recording spectrophotometers the greatest relative accuracy is achieved if the recorded spectrum may be maintained in the 50–100 percent range of the recording device. With a sample having a scattered intensity which varies over two or more orders of magnitude this is not possible without proper attenuation. This attenuation may be accomplished either by optical attenuation of the more intense scattered beams or by electronic attenuation of the signals from these beams. Electronic attenuation is preferable to optical attenuation because attenuation by exact factors is possible. Attenuation by large factors, however, generally may not be made electronically because in some spectrophotometers the output signal is not precisely proportional to the radiation intensity upon the detector over such a great range. The light-scattering spectrophotometer disclosed herein utilizes both optical and electronic attenuation arranged in such a manner that the optimum advantages of each are utilized such that the output of the ratio-recording spectrophotometer may be maintained within the 50–100 percent range of the recorder. The advantages herein have been provided while retaining the advantage of the previous system in that the apparatus may be constructed in the form of an attachment which can be utilized with spectrophotometers commercially available without significant modification and without destroying their usefulness for routine spectroscopic analysis.

It is a principal object of the invention to provide an improved apparatus and method for performing various light-scattering analysis.

Another object is to provide a light-scattering spectrophotometer capable of measuring scattered intensities over several orders of magnitude with the same relative accuracy.

A further object of the invention is the provision of an improved apparatus wherein the scattered intensity or the ratio of the scattered intensity to the incident intensity may be automatically plotted as a function of time, angle or wavelength over several orders of magnitude with the same relative accuracy.

Still another object is the provision of an improved light-scattering attachment for a double-beam spectrophotometer whereby the intensity of radiation scattered by a sample may be automatically plotted as a function of time, angle or wavelength over several orders of magnitude with the same relative accuracy.

Other objects and many of the attendant advantages of the present invention will become more readily appreciated by those skilled in the art by reference to the following detailed description when considered in connection with the accompanying drawings in which like reference numerals designate like parts throughout the several figures thereof and wherein:

FIG. 1 is a diagrammatic representation of an exemplary embodiment of a light-scattering spectrophotometer constructed after the teachings of this invention;

FIG. 2 is a schematic diagram of a modification of the electronic attenuator of FIG. 1; and FIG. 3 is a detailed view of the scattered light cell unit incorporating a light trap for use in the apparatus of FIG. 1.

Referring now the drawings and more particularly to FIG. 1 thereof the preferred embodiment of the light-scattering spectrophotometer illustrated therein generally comprises a radiation source 11; an optical modulator or beam chopper 12 and a mirror 13 for directing the modulated beam through the entrance slit of a monochromator 14. Monochromatic radiation from the exit slit of the monochromator is directed to a rotating half mirror or beam splitter 16 to provide a reference beam 17 and a sample 18 which pass the sample compartment of a double-beam, ratio-recording spectrophotometer.

The spectrophotometer, if of standard commercial design, will generally also include a second fixed mirror and a second rotating half mirror or beam recombiner driven in synchronism with the beam splitter 16 to provide sample and reference radiation signals along a common optical path to the single detector 19 which forms a part of the standard instrument. The beam recombiner and the second fixed mirror have not been illustrated in the drawing for the sake of simplicity since they are not utilized when a standard spectrophotometer is modified in accordance with the teachings of this invention, although their presence and operation do not affect the operation of the instrument as a light-scattering spectrophotometer.

Interposed within the reference beam in the sample compartment is an optical attenuator in the form of a filter slide 20 which holds a plurality of high density neutral filters for providing optical attenuation in large steps, such, for example, as 4, 10, 40, 100, 400, etc. The neutral filters for attenuating the reference beam are actuated by push rods 21 from the face of the instrument. Filters may be imposed in the reference beam by pushing the respective rods in to select the particular desired attenuation factor.

A second detector 23 and mirror 24 are each mounted on a rotatable disc 25 which may be either rotated manually or by a detector scan motor 27 through gear drive 28. A light-scattering cell 30 is mounted coaxially with disc 25 but is not secured thereto and is stationary. Fixed mirror 31 is imposed in the sample beam path 18 in the sample compartment of the spectrophotometer and reflects radiation from this path along an excitation beam path passing an elongated slot or aperture 32 in disc 25 and reflected by fixed mirror 33 to the entrance window of cell 30. A three-position, excitation beam filter slide 34 is imposed in the excitation beam. In the first position, as illustrated in FIG. 1, the excitation beam passes an open aperture 35. In the second position the beam is blocked by the slide and in the third position the beam passes a second aperture having a neutral filter 36 of high density for the purpose of attenuating the incident beam to a small fraction of its value when measurements are to be made at or near zero degrees. By rotation of the disc with respect to the sample cell 30, the angle A between the plane of the incident energy and the scattered light may be varied.

The electrical signal output of detectors 19 and 23 are connected through an electronic attenuator 37 and commutator 38 to an amplifier 39. The output of amplifier 39 is connected to a second commutator 41 which alternately connects the output of amplifier 39 to reference and sample demodulators 42 and 43 respectively. Commutators 38 and 41 are driven in synchronism by motor 44 which also drives the rotating half mirror or beam splitter 16.

The output of reference demodulator 42, generally referred to as the reference signal, is connected through amplifier 45 to a slit drive motor 46 to control the slit size in such a manner as to maintain the reference beam energy constant. As is well known in the art, this slit-width control circuit provides constant energy in the excitation beam thereby compensating for variations in instrument efficiency at various wavelengths and further compensates for variations in the output of the source as a function of time or wavelength. The output from reference demodulator 42 is also connected through an indicating meter 48 and a potentiometer 49 to a point of common potential or circuit ground.

The output of sample demodulator 43, generally referred to as the sample signal, is connected through potentiometer 51 and the movable contact of potentiometer 52 to the point of common potential. The movable contacts of potentiometers 49 and 51 are connected to the inputs of a differential amplifier 53 having its output connected to the recorder pen drive motor 54. The pen drive motor drives the marking pen of any suitable chart recorder, not shown, and is also connected to the movable contact of potentiometer 49 to provide a feedback connected to differential amplifier 53. When the instrument is operated as thus far described and as illustrated in FIG. 1, i.e., in the double-beam mode, the chart recorder provides a record of the ratio of the scattered light intensity to the reference light intensity either as a function of time, angle or wavelength, depending upon the operation of the various other components of the system. Potentiometer 51 provides for setting the 100 percent point on the ratio recording scale and potentiometer 52 provides a setting for the zero point.

Switch 56 in the output circuit of reference demodulator 42 provides for disconnecting the slit servomotor 46, amplifier 45, amplifier 53 and the pen drive motor 54 from the reference signal. When switch 56 is actuated, the slit drive motor amplifier 45 is connected to the point of common potential or circuit ground and meter 48 and potentiometer 49 are connected to a source of reference potential through resistor 57. When switch 56 is so actuated, the instrument operates in the single-beam mode and the output of detector 23, which is due to the scattered light intensity, provides the input to amplifier 53. Thus, the recorder provides a record of the scattered light intensity as a function of time, angle or wavelength depending upon the operation of the other components within the system.

The rotating half mirror or beam splitter 16 provides radiation along the excitation path and the reference path alternately in synchronism with commutators 38 and 41. The reference beam path includes filter slide 20 for the purpose of providing optical attenuation. As has been pointed out, optical attenuation is accomplished by placing neutral filters in the reference beam. The reference beam intensity controls the slit opening through reference demodulator 42, amplifier 45 and slit drive motor 46, such that the reference beam intensity is maintained constant. When a neutral filter is placed in the reference beam, the reference beam energy is decreased causing a resulting decrease in the output of reference detector 19. This decrease signal causes the slit servo loop to open the entrance and exit slits thereby increasing the intensity of the radiation in both the sample and reference beams by the same factor that the filter attenuates the reference beam. The net effect is to increase the scattered radiation level by a factor equal to the reciprocal of the filter transmittance. The choice of neutral filters depends on the intensity of the scattered beam. With highly scattering samples the optical attenuation required in the reference beam is low while with weakly scattering samples the attenuation required in the reference beam is high. Thus the optical attenuator constitutes one means for attenuating the reference signal thereby changing the range of the recorder by a factor equal to the reciprocal of the filter transmittance.

Electronic attenuation of either the reference or sample signals is provided by electronic attenuator 37. The electronic attenuator comprises three steps of resistance each step including a fixed resistor 57 and a precision potentiometer 58, only the first step having been indicated with reference numerals. The third step is connected to the point of reference potential or circuit ground through resistor 59. It is apparent by appropriate adjustment of the potentiometers the output potential at each of the taps may be made a precise fraction of the total potential across the attenuator.

A pair of eight position switches 61 and 62 have their movable contacts 63 and 64 ganged together and respectively connected to separate fixed terminals of commutator 38. Switch 61 controls attenuation of the sample signal while switch 62 controls attenuation of the reference signal. The first four contacts of sample switch 61 designated ⅛, ¼, ½ and 1 are each connected together and to a point of no attenuation on the attenuator. The fifth contact designated 2 is connected to the first step of the attenuator while the sixth and seventh contacts designated 4 and 8 are connected respectively to the second and third steps of the attenuator. The final contact designated "OFF" is connected to circuit ground. The first contact designated ⅛ of reference switch 62 is connected to the third step of the attenuator while the second and third contacts designated ¼ and ½ respectively are connected to the second and first steps of the attenuator. The next five fixed contacts designated 1, 2, 4 and 8 are each connected together and to the point of no attenuation. The eighth contact designated "OFF" of reference switch 62 is also connected to a point of no attenuation of the signal. The switches are labeled ½, ¼, and ⅛ for attenuation of the reference signal by factors of 2, 4 and 8 and are labeled 2, 4 and 8 for attenuation of the sample signal by factors of 2, 4 and 8. At position 1 there is, of course, no attenuation of either of the signals. Since commutator 38 connects reference switch 62 to the input of amplifier 39 during the period of time when the sample beam is blocked and the reference beam impinges upon detector 19, it is apparent that the switch 62 controls attenuation of the reference signal only and is not affected by sample signal. Conversely, when commutator 38 connects sample switch 61 to the input of amplifier 39, the beam splitter 16 blocks the reference beam and scattered radiation from sample cell 30 impinges upon detector 23. It is apparent that the electronic attenuator provides attenuation over the range of 64 to 1 by attenuating either the reference or the sample signals over a portion of this range.

The electronic attenuator thus constitutes a second attenuation means which attenuates the output signal of detectors 19 or 23 and thus either reduces the range of the recorder by a factor equal to the factor by which the reference signal is attenuated or increases the recorder range by the factor by which the sample signal is attenuated.

With most scattering samples, the light scattered at small angles may be of 1 or 2 orders of magnitude greater than that scattered at 90°. Unless advance information is known as to the scattered light characteristics of the particular sample it may be necessary to find the optimum combination of reference filters and electronic attenuator setting by trial and error. The reference beam neutral filter combination is optimum when, at the angle giving the lowest signal, the scattered intensity can be read on the chart between 50 and 100 percent using one attenuator setting and, at the angle giving the highest signal for all angles to be measured, the scattered intensity can be read on the chart between 50 and 100 percent using the same or a higher attenuator setting. For example, with the electronic attenuator switches set at 1 and an optical filter placed in the reference beam having an optical density of 1.6 giving the attenuation of 40, the 50–100 percent range of the recorder corresponds to 1.25–2.5 percent. By rotating electronic attenuator switches 61 and 62 to the 2, 4 and 8 positions, thereby attenuating the sample signal, the 50–100 percent range of the recorder chart corresponds respectively to 2.5–5.0 percent, 5.0–10 percent and 10–20 percent. If a larger range is needed the reference and sample switches may be moved to the ½, ¼, or ⅛ position although it is generally desirable to avoid attenuating the reference beam since the slits of the monochromator are opened as the reference signal is attenuated and thus for each lower step of reference attenuation will close until maximum reference signal is applied to the input of amplifier 39. It is generally desirable during the scan of a given sample to avoid large changes in the slit width since the speed of response of the slit servosystem is relatively slow, hence information is unreliable during the period of time during which the slits are changing.

Referring now to FIG. 2 there is illustrated a modification of the electronic attenuator of FIG. 1 which comprises a reference potentiometer 64 connected to the reference detector 19 and a sample potentiometer 65 connected to sample detector 23. Each attenuator has four steps for attenuating each of the reference and sample signals by factors of 1, 2, 3 and 8. It is believed that the functioning of the potentiometers is obvious after consideration of the description and operation of the electronic potentiometer 37 of FIG. 1. The electronic potentiometer 37 of FIG. 1 comprising a single resistor chain has the disadvantage in instances where photomultipliers are being utilized as radiation detectors that the dark current of each of the detectors flows therethrough raising the dark current signal level in both the reference and sample channels. When scattered radiation is extremely low resulting in an output signal slightly greater than the dark current signal level, the signal-to-noise ratio at the input of amplifier 39 is greatly reduced. By providing separate potentiometers for the reference and sample detectors as in FIG. 2 the dark current signal from the sample detector is not present in the reference potentiometer and vice versa therefore increasing the signal-to-noise ratio under the same conditions. Thus, where extremely low signal levels are present the embodiment of FIG. 2 enchances the signal-to-noise ratio of the system. However, where the output signals are relatively high the additional dark current present in the single potentiometer of FIG. 1 does not significantly change the signal-to-noise ratio within the system.

Sample cells for use in light-scattering measurements of certain solutions, such, for example, as polymers and hydrosols, must have certain features. Stray light from multiple reflections at interfaces and scattering by striations in the cell material must be practically eliminated since radiation caused by scattering of the incident beam by the sample may be as small as $10^{-8}$ of the incident beam. One of the disadvantages of cylindrical cells is that the faces thereof act as lenses. Since in light-scattering photometry parallel beams are required for good angular symmetry it is generally desirable that the windows for both entrance and exit of the beam be flat. The lens effect of the cell is caused both by glass-air interfaces and glass-liquid interfaces although the glass-air interface has a much greater effect because of the larger difference in refractive index. Several elaborate designs for eliminating stray light have been utilized in the prior art which have incorporated entrance and exit tubes, baffles and various types of beam traps. These cells, although greatly reducing stray light, make routine use extremely complicated because of the problems in filling and cleaning of the cells. Furthermore, such cells are expensive to manufacture. There is illustrated in FIG. 3 a sample cell and beam trap combination which, although having certain of the disadvantages of cylindrical cells, has eliminated, to a great extent, much of the stray light resulting from the cell, yet is simple of manufacture and highly adaptable to routine use because of its simple configuration. A cylindrical glass cell 67 is utilized which has been ground flat on the outside of one side to form a flat entrance window 68. Thus the glass-air interface at the entrance window is flat. The lens effect, although still present at the glass-liquid interface of the entrance window, can be minimized by making the radius of curvature as high as possible although the cell generally should not be too large because clean liquid must be prepared which can be a difficult process.

Stray light due to reflection of light at the interfaces at the exit window have been eliminated by utilization of a beam trap within the cell. The beam trap generally comprises a small, black rectangular portion 69 having an optically flat surface, is supported within the cell by a rod 70 and is oriented perpendicular to the beam. Since the beam trap comes in contact with the solution land must not contaminate it, it is generally desirable to construct the beam trap of glass. Black glass which may be fused to a black glass rod has been found particularly suitable for this application. The glass is polished flat and is made slightly larger than the beam. Most of the radiation is absorbed by the glass but a small fraction is reflected back into the incident beam. The amount of light reflected by the beam trap is much less than that reflected by the exit window of the cell since reflectance depends upon the ratio of the refractive indices at the interfaces.

It is the general practice to place the cell in a thermostating jacket 75 and by cementing small spots of epoxy resin to the outside of the cell and grinding these spots to just fit the thermostat, the cell may be precisely positioned within the thermostat without danger of scratching the cell even though the surfaces are very closely spaced. The beam trap may be supported within the cell by any suitable manner such as clamping the rod 70 within the thermostat cover 76. By bringing the rod through the cover the beam trap may be rotated therein until the flat surface is perpendicular to the beam.

As indicated by the dotted lines the light-scattering device may readily comprise an attachment for use with conventional double-beam spectrophotometers. The attachment is provided with an enclosure in which the various parts are mounted and comprises a first compartment 72 within which the rotating disc, the cell and certain of the optical elements are mounted and a projecting portion 73 which fits into the cell compartment of the spectrophotometer. Thus in applications where light-scattering and photometric transmission measurements must be made in conjunction with each other, a single instrument is provided which is capable of performing these measurements thus eliminating errors due to wavelength calibration and wavelength resolution between two separate instruments. The attachment may also house other optical components which have not been illustrated here for the sake of simplicity for the purpose of collimating the excitation beam and for maintaining the beam geometry substantially independent of the width of the monochromator exit slit. The apparatus described herein is capable of measuring light scattered over the range of approximately 0° to 158° and is limited only by the configuration of the sample or the sample cell. The angle of acceptance of the scattered beam by the detector may be limited by apertures and lenses thereby providing high angular resolution.

The beam chopper 12 is generally a motor driven apertured disc which interrupts the beam at a suitable frequency, typically 480 cycles per second. The entrance and exit beams of the monochromator are generally disposed one above the other to permit usage of a single pair of slit jaws. The monochromator disperses the radiation of the source to provide a narrow band of radiation at the sample cell and this narrow band may be scanned over a wide spectrum by rotating the prism with a prism drive 74. It is obvious to those skilled in the art that other types of monochromators may be utilized and various filters, condensing and collimating mirrors and condensing lenses may be utilized in the monochromator which have been omitted for the sake of simplicity.

While the apparatus illustrated herein is capable of measuring scattered light at a given angle as a function of wavelength it is the more general practice to set the monochromator at a fixed wavelength and measure the radiation scattered at various angles and then change the monochromator wavelength. Utilizing the instrument in the latter manner the use of two detectors does not affect the accuracy of the instrument even though the detectors are not matched since the reference detector and the reference signal channel are utilized only to maintain background energy constant. Thus, a difference in sensitivity of the detectors or a difference in the change of the sensitivity of the detectors as a function of wavelength does not affect the operation of the instrument except when wavelength is being scanned. However, when measuring scattered light at a given angle as a function of wavelength, the transmission of both the sample and any optical attenuator will vary thus requiring, in practice, an additional measurement of the energy transmitted by the sample at zero degrees also as a function of wavelength and the manual plotting of the ratio of these two measurements. By this process, any differences in sensitivity of the detectors will be automatically compensated.

The light-scattering photometers of the prior art have employed filters to provide monochromatic light and have employed mercury arc lamps providing only certain wavelengths of radiation. In the present invention light of any wavelength between 320 m$\mu$ and 650 m$\mu$ may be utilized. This is accomplished by using a brilliant source such, for example, as an Osram HBO 100 or a P.E.K. 107 high-pressure mercury arc and a monochromator. This source provides particularly high intensities at 436 m$\mu$ and 546 m$\mu$ and can be utilized for applications involving low scattering samples, for example, the scattering by a pure liquid. In scattering samples the ability to select a desired wavelength provides the advantage that the particular size of absorbing or colored particles can be determined. Light scattering and fluorescence can readily be distinguished by varying the wavelength since fluorescence does not occur above a certain wavelength. Studies of particle size or molecular weight distribution and studies of particle shape are greatly facilitated by the ability to vary the wavelength as well as measure the angle of scatter. The range of wavelength may be extended to 200 m$\mu$ by substituting quartz optics components for the Pyrex components generally utilized.

As hereinbefore stated the light-scattering cell may be fitted into a close-fitting thermostating jacket having a suitable opening for the transmission of the excitation beam and a path for measuring the scattered light. The sample cell is generally constructed of such size to allow dilution and stirring of samples within the cell and to accept smaller, inner cells for use with small samples. When a smaller, inner cell is utilized it is generally desirable to fill the outer cell with a liquid having approximately the same refractive index as the solution or sample and in which is immersed the smaller cell. The smaller cell may be held by any suitable holder which may be placed on the thermostating jacket above the multipurpose cell and detents may be provided in the thermostating jacket for centering the smaller sample cell at the center of the excitation beam path.

Although the invention has been described with particularity in connection with FIGS. 1, 2 and 3, it is to be understood that the figures are merely exemplary of preferred embodiments of the invention and it is not necessary to construct the light-scattering device as an attachment for a standard spectrophotometer, rather the apparatus may be constructed as a single purpose instrument. It is obvious that variations and modifications thereof are apparent to and within the scope of those skilled in the art without departing from the scope of the appended claims.

What is claimed is:

1. An attachment for scattered light measurement for use in a double-beam spectrophotometer having a radiant energy detector and first and second radiation beams comprising:
   a radiation detector;
   means defining a radiation beam path for passing said first radiation beam of said spectrophotometer to a sample mounted in said attachment;
   detector means mounting said radiation detector adjacent said sample and including a scattered light path from said sample to said radiation detector, said detector mounting means being movable about said sample so that the scattered light may be measured over a wide angle with respect to the radiation beam path to said sample;
   optical attenuator means including a plurality of neutral filters;
   means defining a radiation path for passing said second radiation beam of said spectrophotometer through said optical attenuator means to said radiant energy detector in said spectrophotometer; and
   means for selectively positioning at least one of said plurality of filters in said second radiation beam whereby the attenuation of said second radiation beam may be varied.

2. An instrument for scattered light measurement as a function of time, angle and wavelength comprising:
   a radiation source;
   a sample cell;
   first radiation detector means;
   means defining a first radiation path from said source to said sample cell;
   detector mounting means mounting said first radiation detector adjacent said cell and including a scattered light path from said cell to said detector, said detector mounting means being movable about said cell such that the scattered light may be measured over a wide angle with respect to the radiation beam path to said cell;
   second radiation detector means;
   means defining a second radiation path from said source to said second detector;
   means directing radiation from said source alternately along said first and second radiation paths;
   means connected to said first and second radiation detectors for measuring the ratio of the intensity of scattered radiation to the incident radiation and including an indicating device; and
   attenuating means for attenuating the output of at least one of said detector means whereby large variations in the intensity of scattered radiation may be recorded over the same range of said recorder.

3. A light-scattering spectrophotometer for measuring scattered light as a function of time, angle and wavelength comprising:
   a radiation source;
   monochromator means for sorting radiation from said source;
   first radiation detector means;
   means defining a radiation path from said monochromator to a sample mounting means;
   detector mounting means mounting said first radiation detector means adjacent said sample mounting means and including a scattered light path from said sample mounting means to said detector whereby said detector produces an electrical sample signal as a function of the intensity of radiation scattered by a sample, said detector mounting means being movable about said sample mounting means such that the scattered light may be measured over a wide angle with respect to the radiation beam path to said sample mounting means;

second radiation detector means;

means defining a second radiation path from said monochromator to said second detector means, said second detector means providing an electrical reference signal varying as a function of the incident radiation from said second radiation path;

beam splitting means for directing radiation from said radiation source alternately along said first and second radiation paths;

means for varying the intensity of the radiation from said monochromator;

circuit means connected to said second radiation detector means and to said last-named means to maintain the intensity of the radiation from said monochromator substantially constant, said circuit means including means for providing an electrical signal output as a function of the ratio of said sample signal to said reference signal; and attenuator means for attenuating at least one of said reference or sample signals whereby differing ranges of said ratios may be represented by a single range of said electrical output signal.

4. An instrument for scattered light measurement as a function of time, angle and wavelength comprising:

a radiation source;

monochromator means for sorting radiation from said source;

sample cell means;

first radiation detector means for providing an electrical output signal varying as a function of incident radiation;

means defining a first radiation path from said monochromator to said cell means;

detector mounting means mounting said first detector means adjacent said cell means and including a scattered light path from said cell means to said first detector means, said detector mounting means being movable about said cell means such that the scattered light may be measured over a wide angle with respect to the radiation beam incident upon said cell means;

said first detector means providing an electrical sample signal varying as a function of said scattered light;

second radiation detector means;

means defining a second radiation path from said monochromator to said second detector means, said second detector means providing an electrical reference signal varying as a function of the intensity of radiation from said monochromator;

beam splitting means for directing radiation from said radiation source alternately along said first and second radiation paths;

means for varying the intensity of the radiation from said monochromator;

first circuit means connected to said second radiation detector means for maintaining the intensity of the radiation output of said monochromator substantially constant;

second circuit means connected to said first detector means and to said first circuit means and having said reference and sample signals as input signals for providing an output signal that is the ratio of said input signals; and attenuating means for selectively attenuating either said reference signal or said sample signal whereby the scale factor of said output signal which is a function of the ratio of said input signals may be varied.

5. An instrument for scattered radiation measurement as a function of time, angle and wavelength comprising:

a radiation source;

sample mounting means;

first and second radiation detector means providing electrical signal outputs varying as a function of incident radiation;

means defining a first radiation path from said source to said sample;

detector mounting means mounting said first detector adjacent said sample mounting means and including a scattered radiation path from said sample mounting means to said first detector, said detector mounting means being movable about said sample mounting means such that the scattered radiation may be measured over a wide angle with respect to said first radiation path, said first detector providing an electrical sample signal varying as a function of the incident radiation along said scattered radiation path;

means defining a second radiation path from said source to said second detector means, said second detector means providing an electrical reference signal varying as a function of the radiation along said second radiation path;

optical attenuator means for selectively attenuating radiation passing said second path;

beam switching means for directing radiation from said source alternately along said first and second radiation paths;

means connected to said first and second radiation detector means for providing an output signal that is the ratio of said sample signal to said reference signal; said means including electronic attenuating means for attenuating selectively said reference and sample signals; and means for disconnecting said reference signal from said last-named means for providing an output signal that is proportional to said sample signal.

6. An instrument for scattered radiation measurement as a function of time, angle and wavelength comprising:

a radiation source;

sample mounting means;

first and second radiation detector means providing electrical signal outputs varying as a function of incident radiation;

means defining a first radiation path from said source to said sample;

detector mounting means mounting said first detector means adjacent said sample mounting means and including a scattered radiation path from said sample mounting means to said first detector, said detector mounting means being movable about said sample mounting means such that the scattered radiation may be measured over a wide angle with respect to said first radiation path, said first detector means providing an electrical sample signal varying as a function of the incident radiation along said scattered radiation path;

means defining a second radiation path from said source to said second detector means, said second detector means providing an electrical reference signal varying as a function of the radiation along said second radiation path;

optical attenuator means for selectively attenuating radiation passing said second path;

beam switching means for directing radiation from said source alternately along said first and second radiation paths;

first potentiometer means connected to aid first radiation detector means;

second potentiometer means connected to said second radiation detector means;

mans connected to said first and second potentiometer means for providing an output signal that is the ratio of said sample signal to said reference signal; and means for disconnecting said reference signal from said last-named means for providing an output signal that is proportional to said sample signal.

7. An instrument for scattered light measurement as a function of time, angle and wavelength comprising:

a radiation source;

a sample cell;

beam trap means positioned within said sample cell;
first radiation detector means;
means defining a first radiation path from said source to said sample cell;
detector means mounting said first radiation detector means adjacent sad cell and including a scattered light path from said cell to said detector means, said detector mounting means being movable about said cell such that the scattered light may be measured over a wide angle with respect to the radiation beam path to said cell;
second radiation detector means;
means defining a second radiation path from said source to said second detector means;
means directing radiation from said source alternately along said first and second radiation beam paths;
means connected to said first and second radiation detector means for measuring the ratio of the intensity of the scattered radiation to the incident radiation and including an indicating device; and
attenuating means for attenuating the output of at least one of said detector means whereby large variations in the intensity of scattered radiation may be recorded over the same range of said recorder.

8. A sample cell for use in a radiant energy analyzer comprising:
   means for confining a fluid sample;
   a beam trap having a black, substantially optically flat surface; and
   movable means for supporting said beam trap within said confining means and for moving said beam trap out of the path of radiant energy passing through said confining means.

9. A sample cell for use in a radiant energy analyzer comprising:
   a sample cell having at least one flat entrance window on one external surface thereof;
   a rotatable cover on said sample cell;
   a beam trap having a black, substantially optically flat surface; and
   means for supporting said beam trap within said cell in an optical beam path through said entrance window;
   said supporting means including means secured to said rotatable cover whereby said beam trap may be rotated out of said beam path by rotation of said cover.

* * * * *